United States Patent
Kwok et al.

(10) Patent No.: US 9,175,623 B2
(45) Date of Patent: Nov. 3, 2015

(54) MASS AIRFLOW SENSOR CALIBRATION EVALUATION

(75) Inventors: Hans Kwok, Chicago, IL (US); Andrew K Fay, Naperville, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/372,262

(22) PCT Filed: Jan. 18, 2012

(86) PCT No.: PCT/US2012/021636
§ 371 (c)(1),
(2), (4) Date: Jul. 15, 2014

(87) PCT Pub. No.: WO2013/109257
PCT Pub. Date: Jul. 25, 2013

(65) Prior Publication Data
US 2014/0336903 A1  Nov. 13, 2014

(51) Int. Cl.
| | |
|---|---|
| *F02D 41/00* | (2006.01) |
| *G06F 19/00* | (2011.01) |
| *G01M 15/04* | (2006.01) |
| *F02D 41/18* | (2006.01) |
| *F02D 41/24* | (2006.01) |
| *G01F 25/00* | (2006.01) |
| *G01F 9/02* | (2006.01) |
| *F02D 21/08* | (2006.01) |

(52) U.S. Cl.
CPC .............. *F02D 41/005* (2013.01); *F02D 21/08* (2013.01); *F02D 41/0055* (2013.01); *F02D 41/18* (2013.01); *F02D 41/2432* (2013.01); *G01F 9/023* (2013.01); *G01F 25/0007* (2013.01); *G01M 15/042* (2013.01); *B60W 2510/0628* (2013.01); *F02D 2200/0402* (2013.01); *F02D 2200/0406* (2013.01); *F02D 2200/0411* (2013.01); *F02D 2200/0414* (2013.01); *F02D 2200/101* (2013.01); *Y02T 10/47* (2013.01)

(58) Field of Classification Search
CPC ... F02D 41/00; F02D 41/005; F02D 41/0055; F02D 2200/402; F02D 21/08; F02D 2200/101; F02D 2200/0411; F02D 2200/0406; F02D 2200/0414; G01M 15/042; G01M 15/04; G01F 9/023; G01F 25/0007
See application file for complete search history.

(56) References Cited

U.S. PATENT DOCUMENTS

| | | | |
|---|---|---|---|
| 6,985,806 B2 * | 1/2006 | Stadler | 701/102 |
| 6,993,428 B1 | 1/2006 | Gundrum | |
| 7,493,762 B2 * | 2/2009 | Barbe et al. | 123/568.21 |

FOREIGN PATENT DOCUMENTS

JP  2000120466 A * 4/2000 ............ F02D 41/02

*Primary Examiner* — Hieu T Vo
(74) *Attorney, Agent, or Firm* — Jeffrey P. Calfa; Mark C. Bach

(57) ABSTRACT

An engine has a controller for causing an EGR system to disallow EGR while concurrently executing a strategy for evaluating calibration of a mass airflow sensor in an intake system by operating the engine at each of different combinations of engine speed and engine load, and for each combination of engine speed and engine load, recording a corresponding output signal of the sensor and also calculating mass flow passing through an intake manifold as a function of intake manifold pressure, intake manifold temperature, speed of the engine, and volumetric efficiency of the engine. The output signal of the MAF sensor and the calculated mass flow passing through the intake manifold at least one combination of engine speed and engine load are used to evaluate the calibration the MAF sensor.

10 Claims, 2 Drawing Sheets

MASS AIRFLOW SENSOR CALIBRATION EVALUATION

TECHNICAL FIELD

This disclosure relates to a mass airflow sensor (MAF sensor) of the type useful in measuring mass airflow entering and passing through an intake system of an internal combustion engine. More specifically, the disclosure relates to evaluating calibration of such a MAF sensor and to recalibrating such a MAF sensor.

BACKGROUND

A MAF sensor is one of a number of different sensors which provide various input data for an engine electronic control unit (ECU) which processes data for controlling various aspects of operation of an internal combustion engine.

Although calibration of a new MAF sensor may be performed at time of manufacture under controlled conditions, various factors which can potentially affect accuracy of initial calibration may nonetheless be present. Accuracy of calibration therefore depends on the accuracy with which such factors are controlled.

When a MAF sensor is in use, various factors may have an effect on MAF sensor calibration which causes the MAF sensor to lose accuracy.

Examples of factors which may affect calibration include set-up variables encountered when a MAF sensor is bench-tested, flow turbulence, aging of materials, etc. Loss of proper calibration may also go unnoticed unless calibration is re-checked.

The precision with which an engine's operation is controlled is relevant to the engine's compliance with certain requirements, such as tailpipe emission regulations. Because control precision depends on accuracy of input data to the engine ECU, any sensor which looses accuracy has the potential to degrade the precision with which the ECU controls an engine.

A known control strategy for an engine's EGR system operates as follows.

The engine ECU calculates total mass flow passing through an intake manifold to engine cylinders by using engine speed, a calculated density of the flow, and engine volumetric efficiency. The flow comprises a mixture of recirculated exhaust and fresh air which has entered and passed through a first portion of an intake system upstream of a mixing point where the exhaust entrains with the fresh air.

The calculated density is premised on the assumption that the flow behaves as an ideal gas and is calculated using intake manifold pressure and intake manifold temperature.

EGR is defined as a percentage (or fraction) of the total mass flow. The remainder is therefore fresh air whose mass flow has been measured by an output signal of a MAF sensor in the first portion of the intake system.

The strategy is effective over a range of engine speeds and engine loads to cause EGR to be controlled to a target EGR percentage which can change as the engine operates. Subtracting the target EGR percentage from unity yields a target percentage for fresh air mass flow. The strategy controls the engine to cause the output signal of the MAF sensor to faithfully follow the fresh air mass flow target percentage. The strategy may control modulation of EGR flow and/or modulation of the total flow entering the intake manifold.

SUMMARY

One general aspect of the disclosed subject matter relates to a method of evaluating calibration of a MAF sensor which providing an output signal measuring mass flow of air which has entered and is passing through a first portion of an intake system of an internal combustion engine, the first portion being upstream of a mixing point at which any exhaust which has been created by combustion of fuel in cylinders of the engine and is allowed to pass through an EGR system entrains with air which has passed through the first portion of the intake system to create a mixture which then passes through a second portion of the intake system to the cylinders.

The method comprises: causing the EGR system to disallow passage of any exhaust to the mixing point; operating the engine at each of different combinations of engine speed and engine load; for each combination of engine speed and engine load, recording a corresponding output signal of the MAF sensor and also calculating mass flow passing through the second portion of the intake system as a function of pressure in the second portion of the intake system, temperature in the second portion of the intake system, speed of the engine, and volumetric efficiency of the engine; and using the output signal of the MAF sensor and the calculated mass flow passing through the second portion of the intake system at at least one combination of engine speed and engine load to evaluate the calibration the MAF sensor.

Another general aspect relates to an internal combustion engine comprising cylinders within which fuel combusts to operate the engine; an exhaust gas recirculation (EGR) system, an intake system comprising a first portion through which air for supporting fuel combustion enters and passes to a mixing point at which any exhaust which has been created by fuel combustion and is allowed to pass through the EGR system entrains with air which has passed through the first portion of the intake system to create a mixture which then passes through a second portion of the intake system to the cylinders, a mass airflow (MAF) sensor providing an output signal measuring mass flow of air which has entered and is passing through the first portion of the intake system, and a controller.

The controller causes the EGR system to disallow passage of any exhaust to the mixing point and concurrently executes a strategy for evaluating calibration of the MAF sensor by operating the engine at each of different combinations of engine speed and engine load, and for each combination of engine speed and engine load, recording a corresponding output signal of the MAF sensor and also calculating mass flow passing through the second portion of the intake system as a function of pressure in the second portion of the intake system, temperature in the second portion of the intake system, speed of the engine, and volumetric efficiency of the engine, and using the output signal of the MAF sensor and the calculated mass flow passing through the second portion of the intake system at at least one combination of engine speed and engine load to evaluate the calibration the MAF sensor.

The foregoing summary is accompanied by further detail of the disclosure presented in the Detailed Description below with reference to the following drawings which are part of the disclosure.

DETAILED DESCRIPTION

Figure 1:
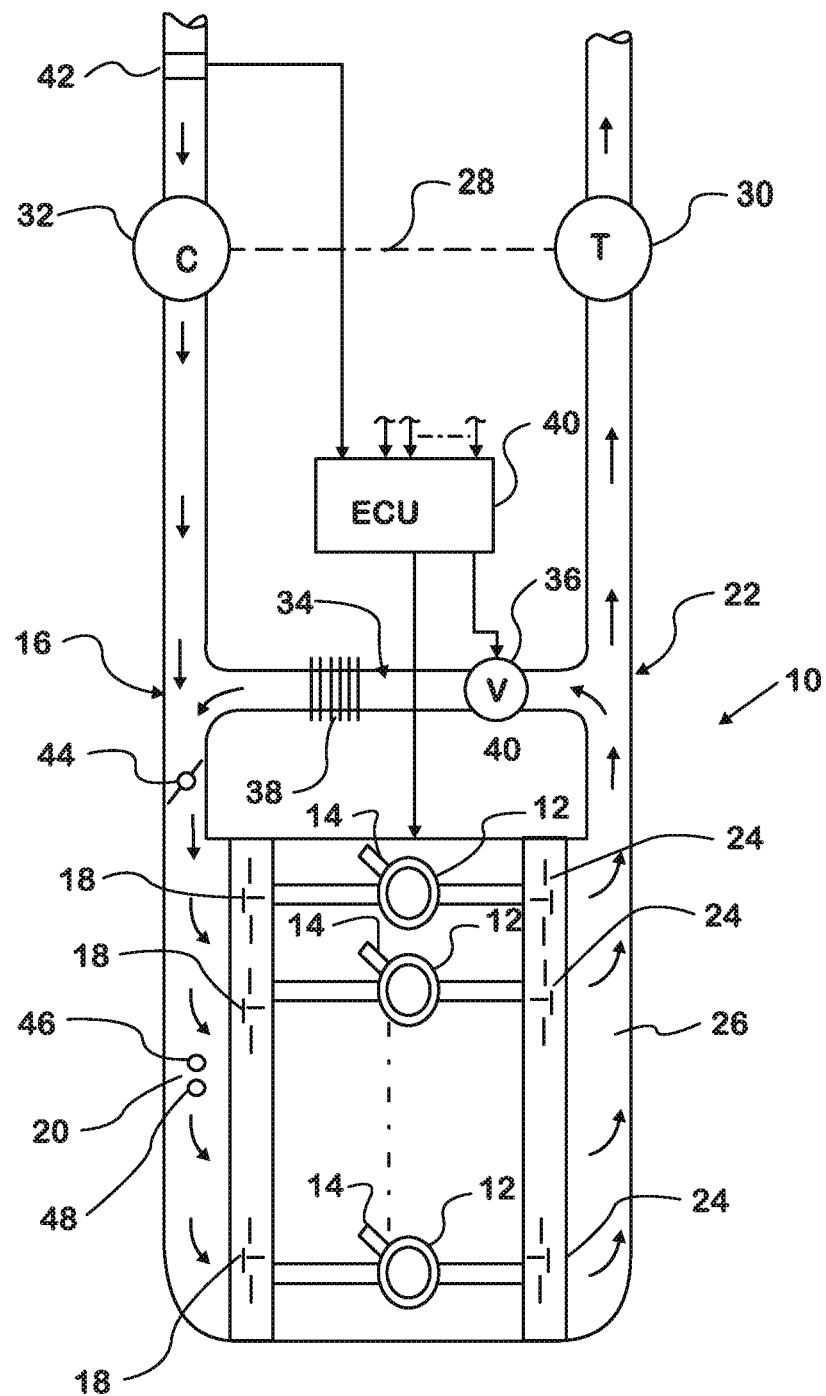
FIG. 1 is a general schematic diagram of an internal combustion engine which has a MAF sensor in an intake system.

FIG. 1 illustrates a representative internal combustion engine 10, a turbocharged diesel engine for example, which operates to power a mechanical load in a stationary or a mobile application. Engine 10 comprises structure forming a number of engine cylinders 12 into which fuel is injected by fuel injectors 14 for combustion with air which has entered combustion chamber spaces of engine cylinders 12 through an intake system 16 when cylinder intake valves 18 for controlling admission of air from an intake manifold 20 into respective engine cylinders 12 are open.

Engine 10 also comprises an exhaust system 22 through which engine exhaust created by combustion of the injected fuel in the combustion chamber spaces is conveyed to atmosphere. Cylinder exhaust valves 24 control admission of exhaust from respective engine cylinders 12 into an exhaust manifold 26 for further conveyance through exhaust system 22.

A turbocharger 28 comprises a turbine 30 in exhaust system 22 and a compressor 32 in intake system 16. Exhaust passing through turbine 30 operates compressor 32 to create superatmospheric pressure in intake manifold 20.

An exhaust gas recirculation (EGR) system 34 has an entrance communicated to exhaust system 22 and an exit communicated to intake system 16. EGR system 34 is representative of a high-pressure EGR system because its entrance is upstream of turbine 30 and its exit is downstream of compressor 32.

EGR system 34 comprises an EGR valve 36 and an EGR cooler 38 in that order from its entrance to its exit. EGR valve 36 is controlled by strategy embodied as software in an engine electronic control unit (ECU), or controller 40, which also comprises other strategies for controlling various devices, such as fuel injectors 14, as elements of a comprehensive engine control strategy.

The junction of the exit of EGR system 34 and intake system 16 is a mixing point at which any exhaust which has been created by combustion of fuel in engine cylinders 12 and is allowed by EGR valve 36 to pass through EGR system 34 entrains with fresh air which has entered and passed through a first portion of intake system 16 upstream of the mixing point to create an air/exhaust mixture which then passes through a second portion of intake system 16 to engine cylinders 12.

A MAF sensor 42 is arranged to provide an output signal measuring mass flow of fresh air which has entered and is passing through the first portion of intake system 16. An intake throttle 44 is arranged downstream of the mixing point and is operable by ECU 40 to modulate total flow into intake manifold 20.

A control strategy for EGR system 34 operates as follows.

ECU 40 calculates total mass flow through intake manifold 16 using engine speed (N), predicted density of the flow ($\rho$), and engine volumetric efficiency ($\eta_{volumetric}$).

The predicted density of the flow ($\rho$) is calculated according to known ideal gas laws using intake manifold pressure and intake manifold temperature. Intake manifold pressure data and intake manifold temperature data for the calculation can be provided by respective pressure and temperature sensors 46, 48 mounted on intake manifold 16.

The EGR control strategy sets a target EGR percentage (requested EGR percentage) as a percentage of the total mass flow passing through intake manifold 16. Because the remaining percentage of the total mass flow is fresh air which has entered intake system 16 and been measured by MAF sensor 42, that remaining percentage becomes a target airflow percentage (requested airflow percentage) for the EGR control strategy.

The strategy is effective over a range of engine speeds and loads to control engine 10 in a manner which causes the output signal of MAF sensor 42 to correspond to the target airflow percentage. In executing the control strategy, ECU 42 may modulate EGR valve 36 and/or intake throttle 44 to cause the MAF sensor output signal to faithfully follow the target airflow percentage.

The control strategy can be described by mathematical equations.

$$\text{Total Mass Flow} = f(\rho, N, \eta_{volumetric}),$$

where $\rho$=flow density, calculated according to the assumption that it is an ideal gas and hence a function of pressure and temperature, i.e. $f(P,T)$, where P, T, and N are variables which can be measured, and where $\eta_{volumetric}$ can be calculated.

The Total Mass Flow of the EGR/air mixture passing through intake manifold 16 is calculated for combinations of engine speed and engine load over the effective speed/load range for the strategy.

Because Total Mass Flow=EGR+Fresh Air, and EGR=% EGR requested*total mass flow, Target (i.e. Requested) MAF=Total Mass Flow*(100−% EGR requested).

In other words, Target (i.e. Requested) MAF= $f(\rho,N,\eta_{volumetric})*(1-\%$ EGR requested).

Figure 2:
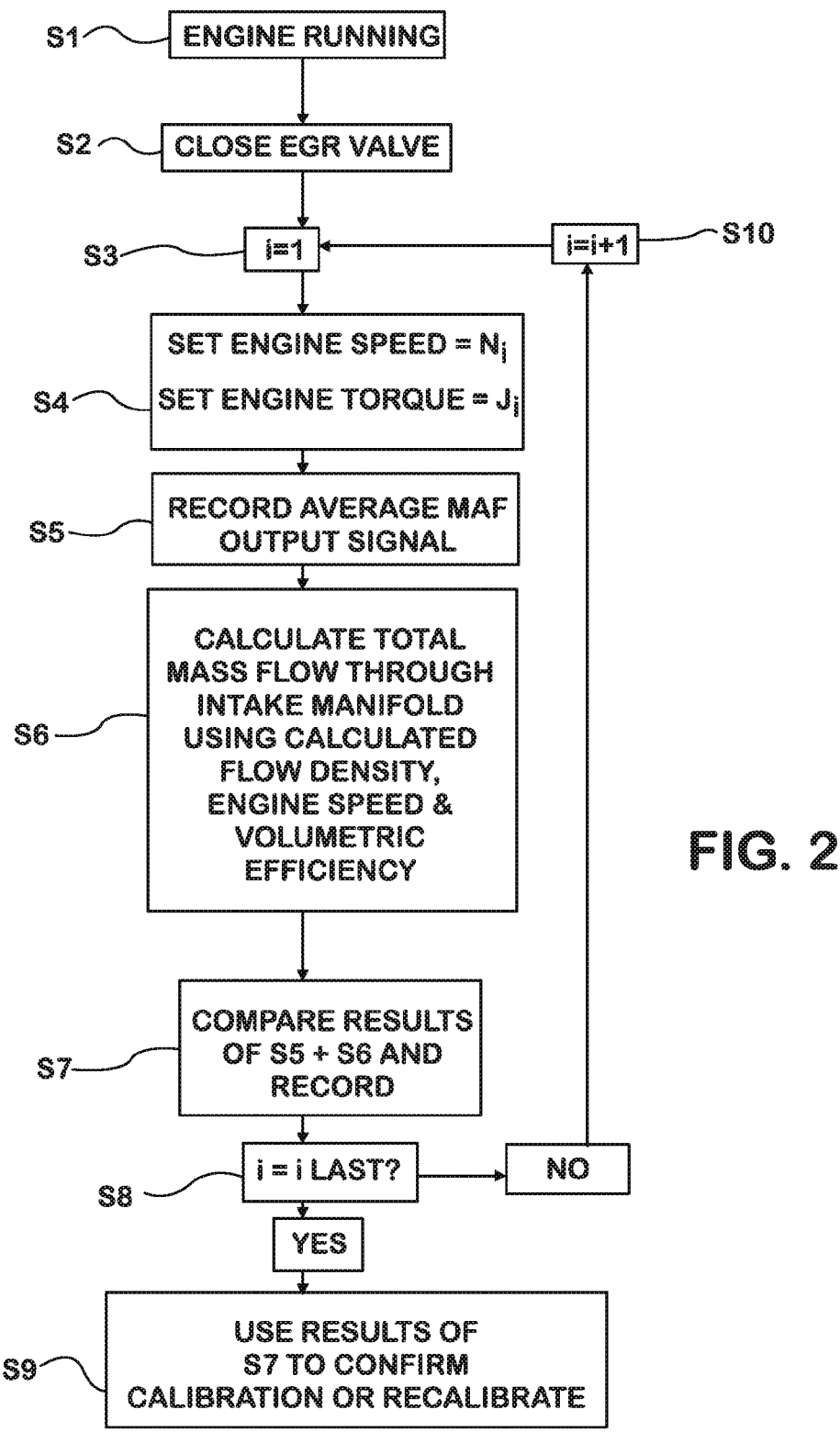
FIG. 2 is a flow diagram illustrating steps for calibrating or recalibrating the MAF sensor.

FIG. 2 discloses steps which include use this equation to calibrate and/or re-calibrate MAF sensor 42 to engine 10 by setting % EGR requested to 0% so that ECU 40 causes EGR valve 36 to disallow any EGR into intake system 16. This will cause Requested MAF to equal the calculated value of the equation $f(\rho,N,\eta_{volumetric})$, provided that the MAF sensor is properly calibrated.

A properly calibrated MAF sensor will have a predetermined functional relationship of its output signal to mass flow through it over a specified range of flows. That relationship may be referred to as the MAF sensor's transfer function.

By setting % EGR requested to 0% with engine 10 operating, the output signal of MAF sensor 42 will equal the calculated value of the equation $f(\rho,N,\eta_{volumetric})$, provided that the MAF sensor is properly calibrated. If the MAF sensor is not properly calibrated, its output signal will not equal the calculated value of the equation $f(\rho,N,\eta_{volumetric})$. Comparison of the output signal at each of various speed/load conditions with the corresponding calculated value of the equation $f(\rho,N,\eta_{volumetric})$ is then used to re-calibrate the MAF sensor by creating a new transfer function for it.

The recalibration procedure can be performed as follows.

With engine 10 running (step S1 in FIG. 2), EGR valve 36 is closed (step S2), causing the mass flow through intake manifold 16 to be equal to the mass flow passing through MAF sensor 42. The engine is operated for limited times at each of various combinations of speed and load (steps S3, S4, S8, S10). For each speed/load combination, the average MAF sensor output signal and the average calculation of equation $f(\rho,N,\eta_{volumetric})$ are recorded (S5, S6) and compared with each other (S7). Any difference in each comparison is also recorded.

Utilizing the result of these comparisons (a minimum of two are required), MAF sensor accuracy can be verified and the sensor recalibrated if needed (S9).

Recalibration is performed by reconstructing the MAF sensor transfer function as a new transfer function, such as by creating a graph plot which provides a best fit of the recorded average output signal of the MAF sensor at at least two combinations of engine speed and engine load to the corresponding average calculation of equation $f(\rho,N,\eta_{volumetric})$.

Best fit can be expressed as a power function, such as: airflow=A·MAF$^{-B}$, where A and B are the transfer function constants, MAF is the MAF sensor output signal and airflow is measured in Kg/hr.

Recalibration can be performed as an automated procedure while the engine is operating. When the engine is the prime mover of a motor vehicle like a large truck, recalibration can be performed at a motor vehicle service bay test at which no driver/technician/mechanic intervention is needed, other than to initiate the procedure.

Once initiated, a recalibration algorithm in ECU 40 verifies basic engine parameters such as oil temperature, coolant temperature, exhaust restrictions, intake and exhaust manifold conditions, and fault/error flags. If these parameters are deemed acceptable, the actual test starts.

The test itself consists of operating the engine as explained earlier, using the engine as a flow generator by shutting off EGR and any other airflow by-passes in intake system 16 so as to force the engine to obtain 100% of the total mass flow through intake manifold 16 to engine cylinders 12 from fresh air measured by MAF sensor 42.

For low fresh airflows which would occur when high EGR % is requested, intake throttle 44 can be modulated to restrict flow through intake system 16.

An automated procedure for a test may set an internal variable/flag to automatically attempt to collect the data required for MAF sensor auto-calibration whenever the load and speed of the engine are suitable. Once sufficient data has been collected, a new MAF sensor calibration can constructed without any intervention.

At a service bay test the automated sequence can be started as a after any work that can potentially influence the MAF sensor calibration, such as after air-filter change, leak repair, new MAF sensor installation, sensor cleaning, etc).

What is claimed is:

1. An internal combustion engine comprising:
    cylinders within which fuel combusts to operate the engine;
    an exhaust gas recirculation (EGR) system;
    an intake system comprising a first portion through which air for supporting fuel combustion enters and passes to a mixing point at which any exhaust which has been created by fuel combustion and is allowed to pass through the EGR system entrains with air which has passed through the first portion of the intake system to create a mixture which then passes through a second portion of the intake system to the cylinders;
    a mass airflow (MAF) sensor providing an output signal measuring mass flow of air which has entered and is passing through the first portion of the intake system:
    a controller for causing the EGR system to disallow passage of any exhaust to the mixing point and concurrently executing a strategy for evaluating calibration of the MAF sensor by operating the engine at each of different combinations of engine speed and engine load, and for each combination of engine speed and engine load, recording a corresponding output signal of the MAF sensor and also calculating mass flow passing through the second portion of the intake system as a function of pressure in the second portion of the intake system, temperature in the second portion of the intake system, speed of the engine, and volumetric efficiency of the engine; and using the output signal of the MAF sensor and the calculated mass flow passing through the second portion of the intake system at at least one combination of engine speed and engine load to evaluate the calibration the MAF sensor.

2. The engine set forth in claim 1 in which the controller comprises a strategy for comparing the output signal of the MAF sensor and the calculated mass flow passing through the second portion of the intake system at at least one combination of engine speed and engine load to enable calibration or re-calibration of the MAF sensor.

3. The engine set forth in claim 1 in which the controller comprises a strategy for using a transfer function which characterizes the MAF sensor to convert the output signal of the MAF sensor at each of at least two combinations of engine speed and engine load to a respective measurement of mass flow by the MAF sensor, for comparing each respective measurement of mass flow by the MAF sensor and the corresponding calculated mass flow passing through the second portion of the intake system, and for using a result of the comparison to enable creation of a new transfer function for the MAF sensor.

4. The engine set forth in claim 3 in which the controller comprises a strategy for enabling a new transfer function for the MAF sensor to be created as a graph plot which provides a best fit of the output signal of the MAF sensor at at least two combinations of engine speed and engine load to the calculated mass flow passing through the second portion of the intake system at the at least two combinations of engine speed and engine load.

5. The engine set forth in claim 3 in which the controller comprises a strategy for enabling a new transfer function for the MAF sensor to be created as a graph plot which provides a best fit of the output signal of the MAF sensor at at least two combinations of engine speed and engine load to the calculated mass flow passing through the second portion of the intake system at the at least two combinations of engine speed and engine load by determining constants A and B of a functional relationship of mass airflow measurement to the output signal of the MAF sensor defined as airflow=A·MAF$^{-B}$, where A and B are the transfer function constants, MAF is the MAF sensor output signal and airflow is measured in Kg/hr.

6. A method of evaluating calibration of a mass airflow (MAF) sensor providing an output signal measuring mass flow of air which has entered and is passing through a first portion of an intake system of an internal combustion engine which first portion is upstream of a mixing point at which any exhaust which has been created by combustion of fuel in cylinders of the engine and is allowed to pass through an exhaust gas recirculation (EGR) system entrains with air which has passed through the first portion of the intake system to create a mixture which then passes through a second portion of the intake system to the cylinders, the method comprising:
    causing the EGR system to disallow passage of any exhaust to the mixing point;
    operating the engine at each of different combinations of engine speed and engine load;
    for each combination of engine speed and engine load, recording a corresponding output signal of the MAF sensor and also calculating mass flow passing through the second portion of the intake system as a function of pressure in the second portion of the intake system, temperature in the second portion of the intake system, speed of the engine, and volumetric efficiency of the engine;

and using the output signal of the MAF sensor and the calculated mass flow passing through the second portion of the intake system at at least one combination of engine speed and engine load to evaluate the calibration the MAF sensor.

7. The method set forth in claim 6 comprising comparing the output signal of the MAF sensor and the calculated mass flow passing through the second portion of the intake system at at least one combination of engine speed and engine load and using a result of the comparison to calibrate or re-calibrate the MAF sensor.

8. The method set forth in claim 6 comprising using a transfer function which characterizes the MAF sensor to convert the output signal of the MAF sensor at each of at least two combinations of engine speed and engine load to a respective measurement of mass flow by the MAF sensor, comparing each respective measurement of mass flow by the MAF sensor and the corresponding calculated mass flow passing through the second portion of the intake system, and using a result of the comparison to create a new transfer function for the MAF sensor.

9. The method set forth in claim 8 in which the step of using a result of the comparison to create a new transfer function for the MAF sensor comprises creating the new transfer function as a graph plot which provides a best fit of the output signal of the MAF sensor at at least two combinations of engine speed and engine load to the calculated mass flow passing through the second portion of the intake system at the at least two combinations of engine speed and engine load.

10. The method set forth in claim 9 comprising creating the new transfer function by determining constants A and B of a functional relationship of mass airflow measurement to the output signal of the MAF sensor defined as airflow= $A \cdot MAF^{-B}$, where A and B are the transfer function constants, MAF is the MAF sensor output signal and airflow is measured in Kg/hr.

\* \* \* \* \*